Dec. 22, 1936.  E. C. BERNDT ET AL  2,065,055
IRRADIATING APPARATUS
Filed June 7, 1934  9 Sheets-Sheet 1

Fig. 1

INVENTOR
EDWARD C. BERNDT
HARRY M. CREIGHTON
BY
Bohleber & Ledbetter
ATTORNEYS Dec. 22, 1936. E. C. BERNDT ET AL 2,065,055
IRRADIATING APPARATUS
Filed June 7, 1934 9 Sheets-Sheet 3

INVENTOR
EDWARD C. BERNDT
HARRY M. CREIGHTON
BY
Bohleber + Ledbetter
ATTORNEYS

Dec. 22, 1936.  E. C. BERNDT ET AL  2,065,055
IRRADIATING APPARATUS
Filed June 7, 1934   9 Sheets-Sheet 5

INVENTOR
EDWARD C. BERNDT
HARRY M. CREIGHTON
BY
Bobber & Ledbetter
ATTORNEYS

Dec. 22, 1936.  E. C. BERNDT ET AL  2,065,055
IRRADIATING APPARATUS
Filed June 7, 1934   9 Sheets-Sheet 7

Fig.12

INVENTOR
EDWARD C. BERNDT
HARRY M. CREIGHTON
BY
Bohleber & Ledbetter
ATTORNEYS Dec. 22, 1936. E. C. BERNDT ET AL 2,065,055
IRRADIATING APPARATUS
Filed June 7, 1934   9 Sheets—Sheet 9

INVENTOR
EDWARD C. BERNDT
HARRY M. CREIGHTON
BY
Bohbert Ledbetter
ATTORNEYS

Patented Dec. 22, 1936

2,065,055

UNITED STATES PATENT OFFICE 2,065,055

IRRADIATING APPARATUS

Edward C. Berndt, Norwalk, and Harry M. Creighton, East Norwalk, Conn., assignors to The R. U. V. Engineering Corporation, South Norwalk, Conn., a corporation of Delaware Application June 7, 1934, Serial No. 729,360

22 Claims. (Cl. 99—247)

This invention relates to improvements in apparatus for, and the method of, irradiating substances by ultra violet rays in order to activate the same and impart thereto beneficial effects including the vitamin D effect or to sterilize the substance.

An important object of the invention is to provide a device in which a substance to be treated is repeatedly conducted past a source of ultra violet rays in the form of a flowing stream, and in which the flow of the stream is so influenced by the configuration of a treating chamber that the substance is intermittently exposed to the rays emanating from said source while the stream is substantially free from agitation or mixing and after each exposure the flow is so influenced as to induce an agitation or mixing of the stream of substance and thereafter exposing the substance again to the influence of the rays to receive a subsequent treatment while it is substantially free from mixing.

Another object of the invention is to provide a device in which a chamber adapted to contain a substance to be treated may be opened up for inspection and various parts of the machine removed to afford ready access to both the inside or outside parts of the machine for cleaning and inspection.

Another object of the invention is to provide a device in which a substance is conducted in a treating chamber longitudinally past an elongated source of ultra violet rays and at the same time intermittently conducted toward and away from said source in passing through said chamber.

Another object is to provide an improved wiping means for a transparent means disposed between the substance being treated and the ray source.

Other objects of the invention, particularly our improved method of treatment, will be pointed out hereinafter or become apparent in connection with the description of the drawings illustrating preferred embodiments thereof, in which

Figure 3 illustrates an end view taken on line 3—3 of Figure 2 and looking in the direction of the arrows.

Figure 4a illustrates an enlarged fragmental view of a portion of the treating chamber shown in Figure 4.

Referring now to the drawings, and particularly to Figures 1 to 4, it will be seen that the device or machine may be described generally as comprising two end supports 20 and 21 mounted between upper and lower spacing beams 22 and 23 all of which is supported upon a base 24. The end supports 20 and 21 carry a source of ultra violet rays which is preferably surrounded by one or more tubes or enclosures transparent to such rays. Inasmuch as the ray source and transparent tubes are supported at each end by means more or less similar in construction, certain portions of the structure may be described with reference to only one end of the device. Accordingly, it will be seen from Figure 4 that a generally circular casting or end wall 25 having a flange 26 is disposed in an opening in the end support 20 and secured thereto. The flange 26 is adapted to support a transparent tube 27 made of quartz or any other material transparent to ultra violet rays, by means of a suitable packing gland. A dish-like collar 30 having a flange 31 mounted on a circular rib 32 formed in the casting 25 is adapted to support a tube 33, also made of material transparent to ultra violet rays. A mercury vapor lamp 34 is axially mounted in the tube 33 by any suitable means. Starting mechanism is provided so that the lamp may be illuminated at the will of the operator to produce ultra violet rays which will pass through the tubes 27 and 33 and into a treating chamber to be hereinafter described. Inasmuch as the lamp mounting and starting mechanism, per se, form no part of our present invention, it is believed unnecessary to describe the same in further detail. The castings 25 are constructed to form end chambers 35 which when closed by covers 36 are adapted to enclose and control the conditions surrounding the lamp 34.

Figure 4:
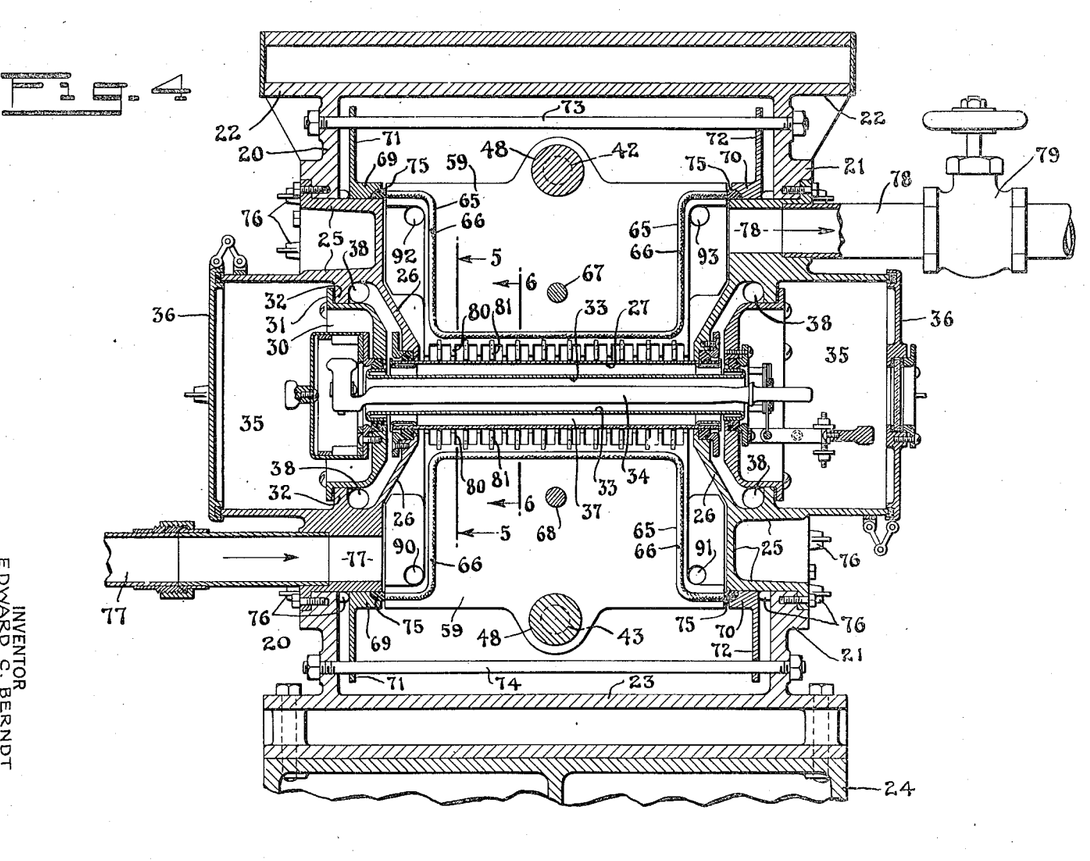
Figure 4 illustrates a sectional view taken on line 4—4 of Figure 2 and looking in the direction of the arrows.

From the above it will be seen that the flanges 26, tube 27, collars 30 and tube 33 form a chamber 37 surrounding the lamp 34. This chamber 37 may be termed a cooling or filtering chamber because it is adapted to contain or permit the passage of a cooling or filtering medium between the lamp and the treating chamber. Openings 38 are provided in the chamber 37 for use as an inlet, outlet and vent ports for conducting the cooling or filtering medium to and from said chamber by any suitable means.

Figure 1:
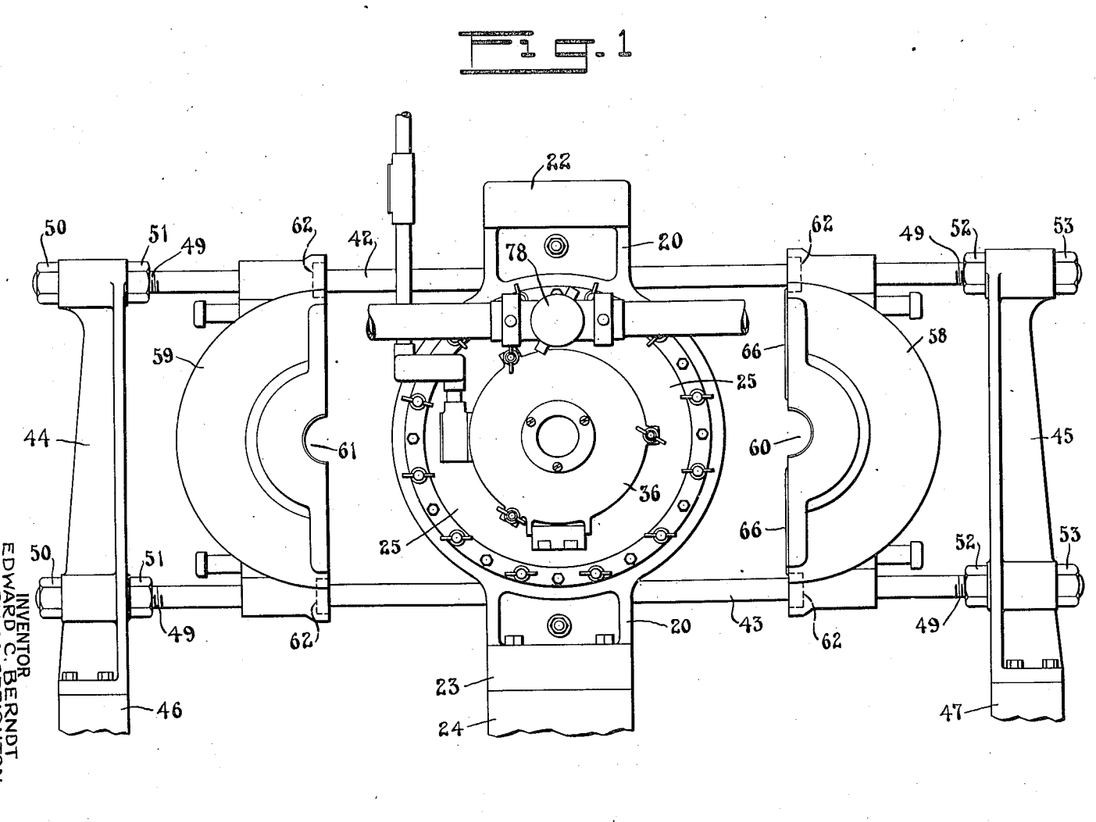
Figure 1 illustrates an elevational view of an irradiating machine with the treating chamber or casing in open position.
Figure 2:
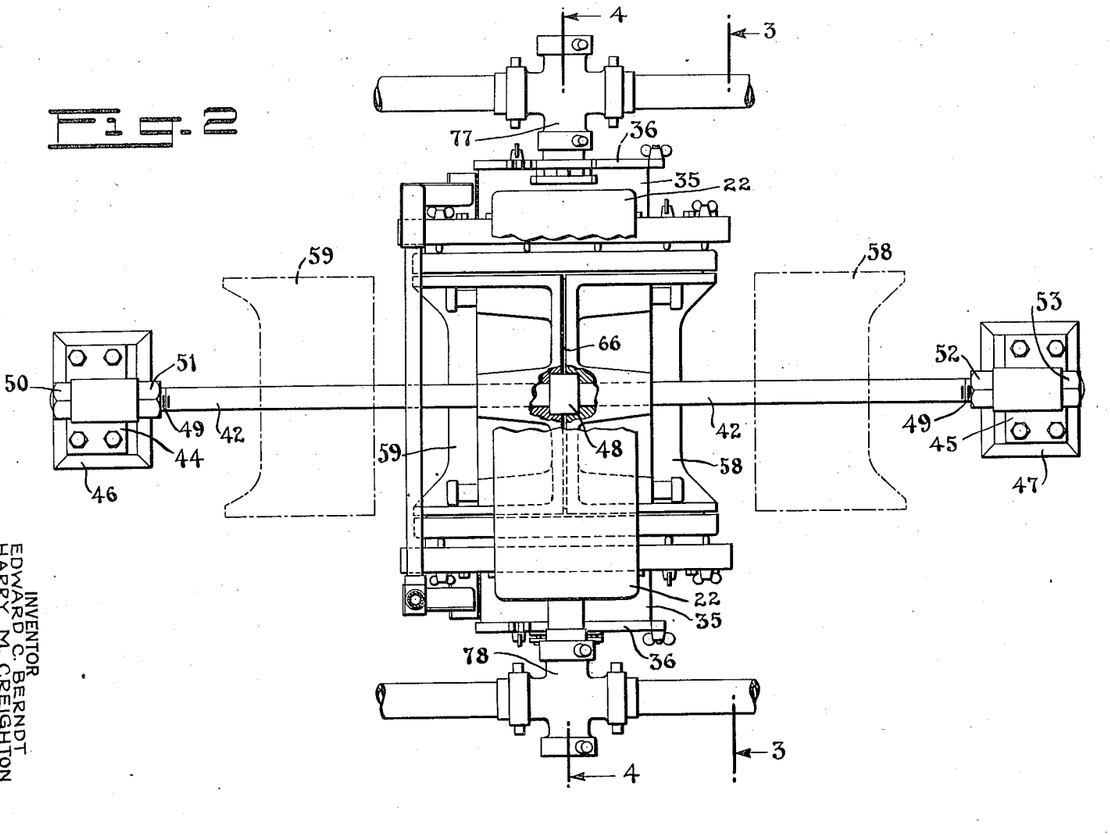
Figure 2 is a plan view of the machine of Figure 1 showing, in full lines, the casing in closed position, and, in dotted lines, said casing in open position.

Referring now to Figures 1 and 2, it will be seen that two guide rods 42 and 43 are mounted one above the other in uprights 44 and 45 and disposed in a plane passing substantially midway between the two supports 20 and 21 and normal to the axis of the lamp 34. The uprights 44 and 45 are mounted upon bases 46—47 which preferably form a part of the base 24 above described so that the machine frame and rods may be rigidly mounted with respect to one another. A collar 48 is formed on or secured to the center of each rod 42 and 43 for purposes to be hereinafter described. The ends of each of the rods are threaded, as at 49, and are adapted to move longitudinally in openings provided in the uprights. By means of pairs of lock nuts 50—51 and 52—53, disposed on the ends of each of the rods, respectively, said rods are adjustably secured to the uprights so that the position of the collar 48 may be moved longitudinally with respect to the machine frame.

Sectional means, illustrated here as a pair of semi-circular members 58, 59 forming what may be termed the treating chamber or casing of the machine, comprising respectively semi-circular depressions 60—61, see Figure 1, are slidably mounted on the rods 42 and 43 to the right and left of the collars 48, respectively, whereby said sections are mounted for movement into and out of cooperating engagement. In a word, the depressions 60—61 are constructed so that when the members 58, 59 are brought together and properly positioned in fixed relationship with respect to the tube 27, they form what may be described as a treating chamber surrounding the tube 27 and through which substance is adapted to pass in a generally cylindrical path parallel to the axis of the tube. The face of the members 58—59 surrounding the rods 42—43 are counterbored, as at 62, see Figure 1, so that when the faces of said members come together in substantially touching engagement, the collars 48 will engage the bottom surface of said counterbores and locate the members 58, 59 with respect to the tube 27. The face of the member 59 is provided with kerfs 65, see Figure 4, adapted to receive any suitable packing material 66, to seal the joint between the members 58—59 when they are brought together face to face and disposed about the tube 27. A pair of bolts 67—68 passing through the members 58—59 are provided to secure the members together and clamp the packing 66 between the faces of said members. From the above it will be seen that the sectional members 58—59 are adapted to be sealed or locked together face to face about the collars 48 and located in fixed relationship with respect to the enclosure 27, and, if necessary, by means of the nuts 50—51, 52, 53, adjustably positioned as a unit with respect to said enclosure so that the enclosure may be centrally disposed within the treating chamber formed by the depressions 60—61. It will be seen that when the members 58—59 are so positioned they will be in line with the castings 25 mounted in the end supports 20—21.

A pair of rings 69—70, see Figure 4, supported by means of extensions 71—72 are slidably mounted on rods 73—74 secured to the end supports 20 and 21 and mounted respectively above and below the rods 42, 43. The rings 69—70 are provided with packing material 75 and adapted to seal the castings 25 to the ends of the sectional members 58—59. When the machine is assembled as above described and illustrated, the sealed treating chamber is adapted to receive substance from any suitable source through an inlet pipe 77 which after treatment may be discharged through an outlet pipe 78 and received in any suitable container. It will be understood that any suitable means not shown is adapted to force substance through the machine at the desired rate of speed.

Figures 5, 6, 7, 8:
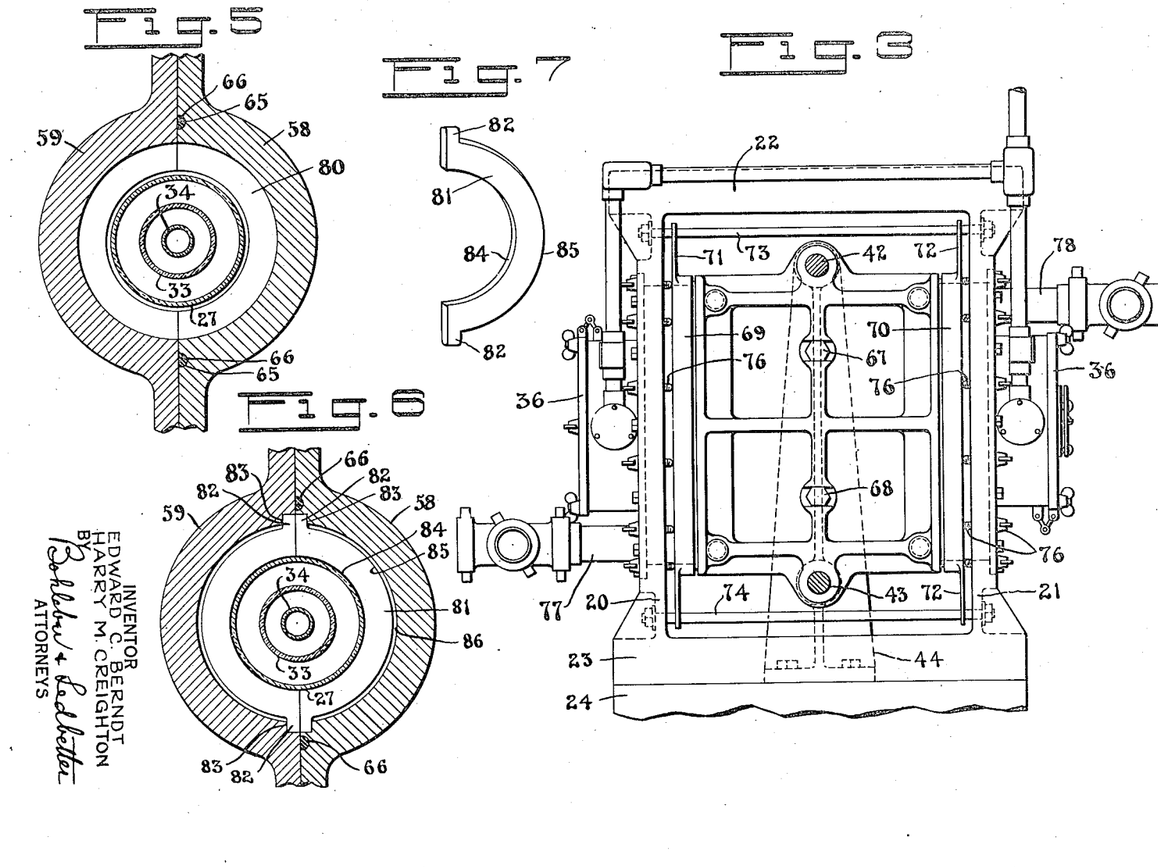
Figure 5 illustrates a sectional view of the treating chamber taken on line 5—5 of Figure 4 and looking in the direction of the arrows.
Figure 6 shows another sectional view of the treating chamber taken on line 6—6 of Figure 4 and looking in the direction of the arrows.
Figure 7 shows a perspective view of one of the deflecting baffles shown in Figure 6.
Figure 8 shows a modified form of treating chamber and baffle arrangement in which yieldable sealing means is provided between the edge of the deflecting baffles and transparent means surrounding a source of ultra violet rays.

Referring now to Figures 4, 4a, 5, 6 and 7 it will be seen that the treating chamber formed by the semi-circular depressions 60—61 comprises a plurality of spaced semi-circular treating baffles 80 disposed throughout the effective length of the lamp and the length of the treating chamber. The inner edges of the baffles 80 are spaced from the tube 27 a distance calculated to permit the substance to flow along the tube 27 for a short distance and past the inner edges of the baffles 80 to receive a treatment. Deflecting baffles 81, see Figures 6 and 7, are mounted in the treating chamber by means of tennons 82 formed on the ends thereof and adapted to fit snugly into notches 83 formed in the members 58, 59. The deflecting baffles 81 are of such proportion that the inner edge 84, see Figures 4a and 6, is disposed just as close to the tube 27 as practical, to permit the members 58, 59 to be drawn together in closed position thereabout and not to crush the tube 27. The baffles 81 are also positioned so that the tennons 82 will hold the rear edge 85 thereof away from the inside surface of the depressions 60—61 to provide a passage 86 remote from the tube 27 through which substance may pass from one treating baffle 80 to another.

Referring now to Figure 4a it will be understood that the spaces 87—88 on either side of the deflecting baffles 81 are proportioned to cause a substance to flow at such velocity through the cylindrical passage 89 between the tube 27 and the ends of the treating baffles 80, and strike the deflecting baffle 81 where it is deflected upwardly and caused to be mixed in the space 87. Substance which is being mixed in the space 87 is prevented from coming into contact with the tube 27 by other substance continually flowing into the space 87 through the passage 89. The opening 86, through which substance may pass out of the space 87 and into the other space or mixing chamber 88 is large enough to prevent substance from forcing its way between the end of the deflecting baffle 81 and the tube 27. After the substance enters the space 88, the mixing action is somewhat reduced and the substance is then forced from the space 88 through the passage 89 between the next treating baffle 80 and the tube 27. The baffle arrangement just described will function as outlined when the size of the passages 89, the depth of the baffles 80 and 81 and the spaces between these baffles are properly proportioned with regard to the speed at which the substance is forced through the treating chamber. The control of exposure of the substance in a treating chamber of this type may be varied by modifying the baffles 80 as will be hereinafter described. A construction of this kind is particularly advantageous in subjecting a substance free from substantial mixing in a plurality of short exposures to the influence of active rays and intermittently interrupting said exposures in order to mix the substance while it is away from the action of the rays. Drain outlets 90—91 and vents 92—93 may be formed in the member 59 to facilitate the filling and emptying of the treating chamber.

It should also be pointed out that when a substance flows through an annular opening under such conditions that it longitudinally traverses a cylindrical treating surface all the particles on said surface travel at the same rate of speed. This characteristic of a hollow flowing stream of annular cross-section will become apparent when one realizes that the speed of the surface particles of such a stream is not influenced by the frictional retardation offered by the end walls and corners necessary to form a flowing stream of rectangular cross-section, hence an annular opening has the advantage of increasing the degree of control of the substance being treated when it is coursed longitudinally along the surface of a tube, as herein described. Moreover a substance flowing longitudinally along a surface which is parallel to the general direction of flow permits of a more accurate control of the irradiation than if the surface is not parallel to the natural direction of flow.

We have also found it important in the treatment of certain substances, such as milk, to consider the pressure changes taking place in the substance during treatment, caused by flow conditions. For example, in treating a substance in devices such as above described, the operating conditions should be such that the substance at all points in the treating chambers while flowing therethrough and being treated is at all times under sufficient pressure to prevent release of gases from the substance. This may be accomplished in several different ways. One way would be to provide a valve 79 in the discharge or outlet pipe 78, see Figure 4, which may be throttled to the proper degree to cause the necessary pressure conditions. When the valve is throttled it would of course require additional pressure to cause the same volume or amount of substance to pass through the device Another way would be to design the device itself in such a manner that the proper pressures would be maintained at all points.

Another way to accomplish this result would be to release and extract from the substance, previous to entering the treating chamber, all gases which would be released under the pressure conditions obtaining in the device. In the treatment of milk for instance it is sometimes important to have the milk practically free from absorbed air during treatment.

Figure 8 illustrates a modified form of treating chamber 95 in combination with a transparent tube 96 in which rings of resilient material 97 are placed on the inner edge of the deflecting baffles 98 so that when the members 99 and 100, corresponding to the members 58 and 59 above described, are drawn together, the deflecting baffles will actually be in sealed contact with the tube and the resilient material 97 will prevent injury to the tube 96. In this case the treating baffles are illustrated at 101 and the opening at the rear of the deflecting baffle is illustrated at 102. Except for the inclusion of the means 97 for sealing the deflecting baffles to the tube 96, to prevent the leakage of any substance between these baffles and the tube, the action of a substance in passing through the treating chamber 95, illustrated in Figure 8 will be similar to that above described.

Figures 8, 9:
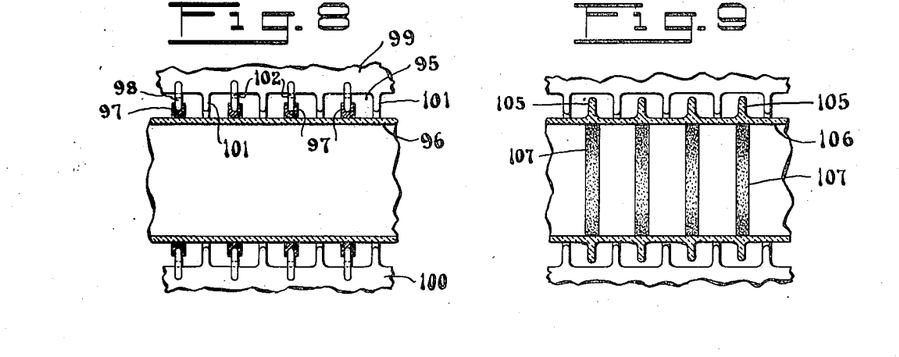
Figure 9 is a modified form of treating chamber and baffle arrangement in which deflecting baffles or fins are formed of and integral with a transparent means surrounding a source of ultra violet rays.

A further modification is illustrated in Figure 9 in which deflecting baffles 105, or fins, are formed integral with a transparent tube 106, and extend outwardly from and normal to the surface of said tube, as another means of preventing substance from passing between the end of a deflecting baffle and the tube.

In order to prevent light from being conveyed through the quartz tube 106 and the baffles or fins 105, and into the mixing chamber when the device is constructed like that described in Figure 9, the inside surface of the tube 106, under the baffles 105, may be coated with a material opaque to the ultra violet rays, as illustrated at 107, or the fin made of opaque material. This material may be a shield, or an opaque lacquer or paint of any suitable sort, or even a plating of gold leaf.

Figure 10:
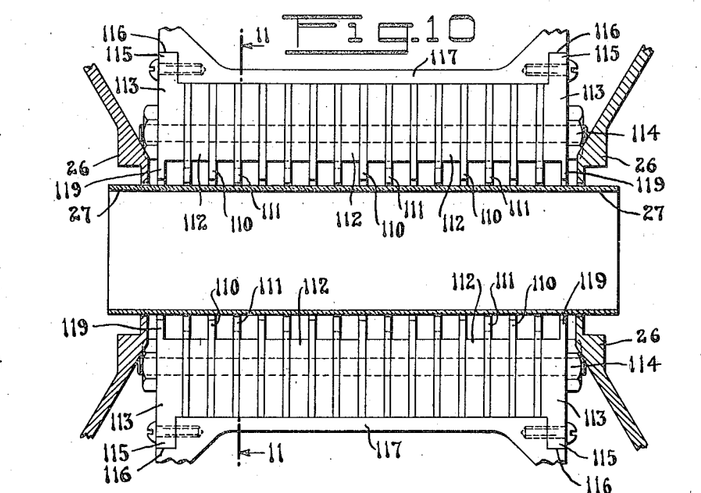
Figure 10 shows a modified form of treating chamber and baffle arrangement in which both the treating and deflecting baffles are readily removable from the device for cleaning and the manner in which a device may be constructed to receive baffles of different sizes to adapt the device for use in the irradiation of different substances or the irradiation of a given substance to produce different results.
Figure 11:
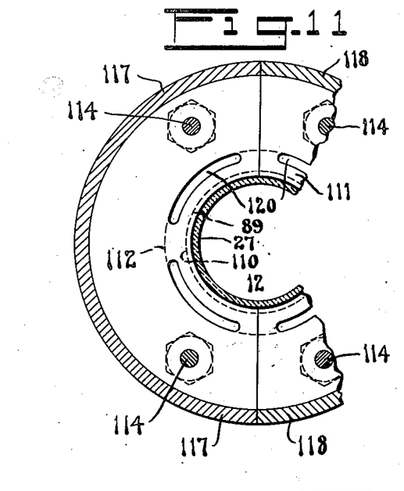
Figure 11 is a sectional view taken on line 11—11 of Figure 10 and looking in the direction of the arrows.

Figures 10 and 11 represent the manner in which a machine may be constructed to accommodate what may be described as interchangeable treating chambers adapted to modify the machine from time to time for either the treatment of various substances or the treatment of a given substance to accomplish different results or varying degrees of the same general result. A chamber of this type preferably comprises a plurality of treating baffles 110, a plurality of deflecting baffles 111 and a plurality of spacers 112 disposed between end discs 113 and secured together by means of bolts 114. The end discs 113 comprise a flange 115 adapted to fit into counterbores 116 formed in members 117 and 118, see Figure 11, which members are similar to members 58 and 59 above described. The shape of the inner edges 119 of the discs 113 are similar to that of the treating baffles 110 so that in effect the discs 113 comprise a combined treating baffle 110, a spacer 113 and the flange 115. It will be understood that when a treating chamber is built up of a plurality of different pieces as above described and disposed in a machine similar to that shown in Figure 4, the flange 26 and tube 27 will both occupy positions in the assembled machine similar to those shown in Figure 10. Openings 120 are provided in the deflecting baffles 111 so that substance traversing the treating chamber may pass successively through the spaces between the ends of the treating baffles 110 and the tube 27 and intermittently flow along the tube until it impinges against the deflecting baffles 111 and is directed upwardly into the space separating the treating and deflecting baffles, as above described. It will be understood also that the deflecting baffles are designed to fit proximate if not actually in contact with the surface of the tube 27 so that the substance cannot pass between the edge of the deflecting baffle and the tube. It will also be understood that such a baffle arrangement is adapted for use in connection with the modifications illustrated in Figures 8 and 9 above described. An important advantage of constructing a mixing chamber with baffles of this type is that all parts of the treating chamber may be readily dismantled and cleaned. Moreover, it affords a practical way of using different sized baffles and spacers to vary the distance between the treating baffle and tube and the size of the space between a treating and deflecting baffle to adapt a given machine for treating various substances as above described.

Figure 12:
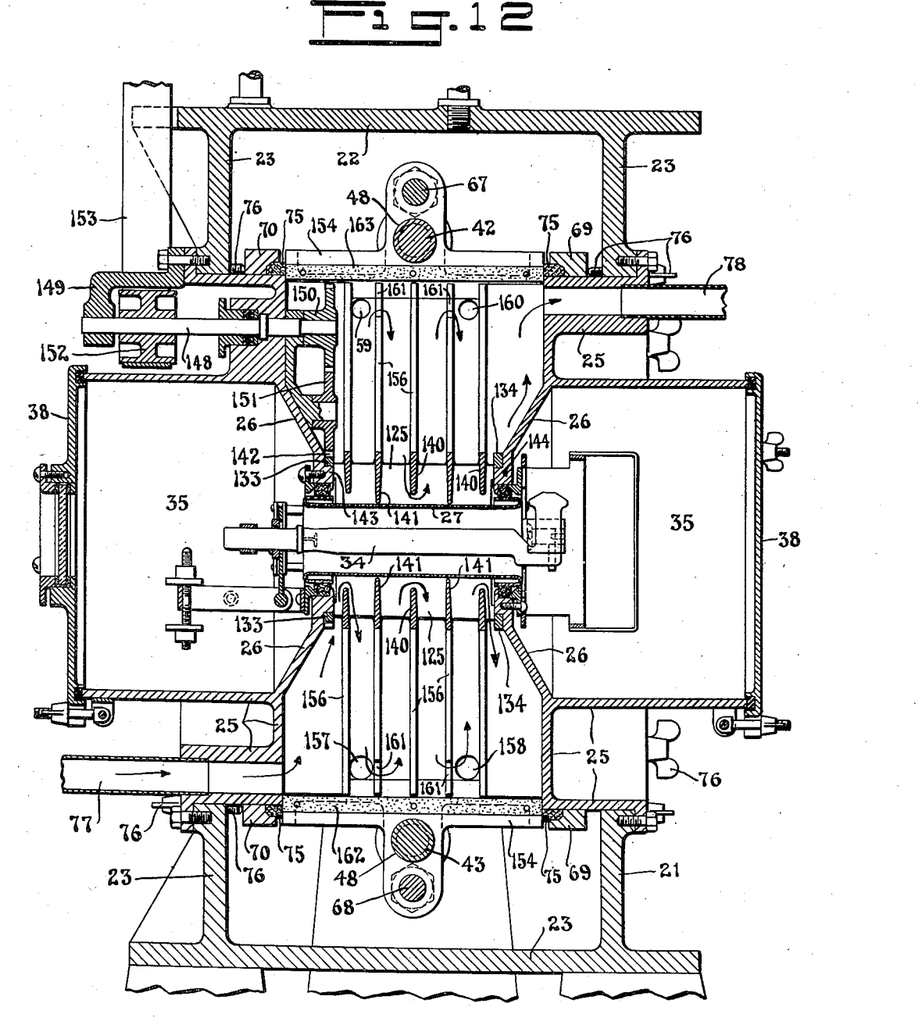
Figure 12 shows a sectional view of the interior of a device having a baffle arrangement generally similar to that heretofore illustrated, but provided with means for wiping the surface of the transparent means with which the substance being treated comes into contact, without substantially altering or obstructing the course traversed by the substance in the treatment thereof.

Figure 12 illustrates a modified form of our invention as applied to a machine of the same general type as that illustrated in Figure 4 except that a revolving wiper means 125 is provided for wiping the tube 27. Many of the parts of this modified form are similar to those already described and hence are correspondingly numbered.

Figure 13:
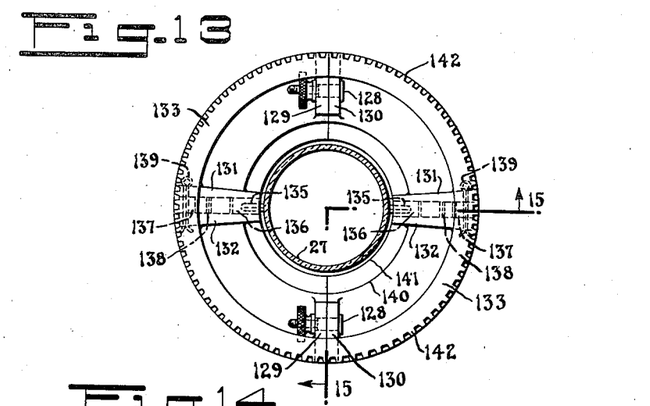
Figures 13 and 14 show end and elevational views respectively of the wiper means illustrated in Figure 12.
Figure 14:
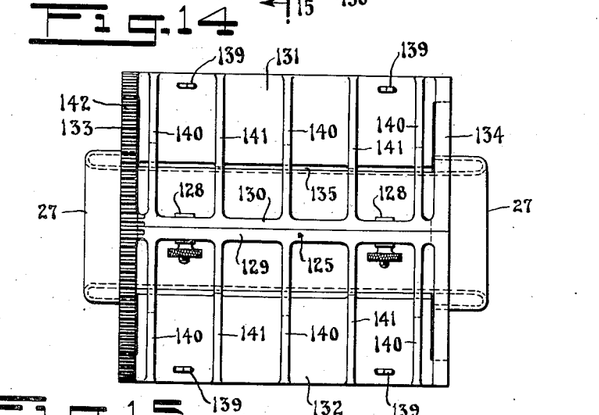
Figure 15:
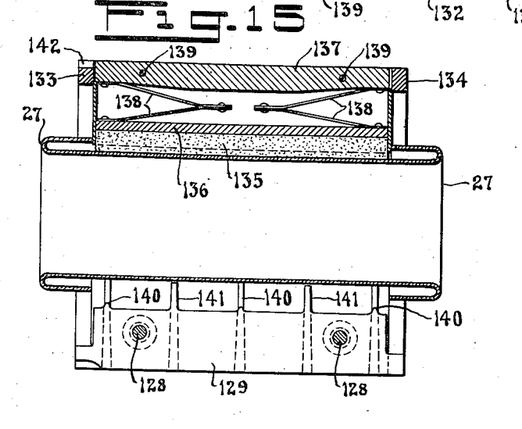
Figure 15 shows a sectional view taken on lines 15—15 of Figure 13, and looking in the direction of the arrows.

Referring now to Figures 13, 14 and 15, it will be seen that the wiping means 125 comprises two semi-circular mountings secured together by means of bolts 128 passing through ribs 129 and 130 which come together face-to-face when the wiper means is assembled. Each of the wiper mountings comprises a pair of spaced plates 131—132 extending substantially the full length of the tube 27 and supported at the ends thereof by portions forming rings 133 and 134 which in turn are supported by the ribs 129 and 130. A wiper 135 mounted on a bar 136 is yieldably secured to a removable bar 137 by means of springs 138. The bar 137 is adapted to be secured between the plates 131 and 132 by means of cotter pins 139 so that the springs will urge the wiper 135 against the surface of the tube 27. Treating baffles 140 and deflecting baffles 141 are alternately spaced between the rings 133 and 134 and supported by the ribs 129 and 130 and plates 131 and 132. Gear teeth 142 are formed on the periphery of one of the rings to cooperate with a driving pinion to be hereinafter described.

Referring again to Figure 12, it will be seen that the wiper means 125 is in effect a cage-like structure surrounding the tube 27 and revolubly mounted by means of the rings 133 and 134 on bearings 143 and 144 formed on the flanges 26 which support the tube 27. A shaft 148 having one end mounted in one of the castings 25 and the other end mounted in a bracket 149, carries a pinion 150 adapted to drive the wiper means 125 through an idler pinion 151, when a pulley 152 and a belt 153 are driven by any suitable source of power. This machine, like those above described comprises a split chamber of semi-circular members mounted to slide towards and from each other on guide rods 42 and 43 which, when secured together by the bolts 67 and 68 will surround the tube 27. In this case, however, the semi-circular members 154 and 155 (the latter being not shown), comprise circular baffles 156 adapted to contact and register with the treating baffles 140 and deflecting baffles 141 and maintain such registration while the wiping means 125 is rotated. Drain outlets 157 and 158 and vents 159 and 160 may be formed in the member 154 to facilitate emptying and filling the treating chamber. Openings 161 are formed in certain of the circular baffles to permit the substance to flow through the machine past the treating and deflecting baffles as indicated by the arrows. It will be understood that the cycle of treating and mixing in this machine may be carried out substantially the same as in the machines above described especially when the tube wiper is rotated slowly enough so as not to unduly mix or agitate the substance during the time it passes between the tube 27 and the treating baffles 140 to receive a treatment. In this machine the members 154 and 155 are brought together face-to-face against gaskets 162 and 163 and when so positioned may be sealed in the castings 25 by means of rings 69 and 70 as above described.

Figure 16:
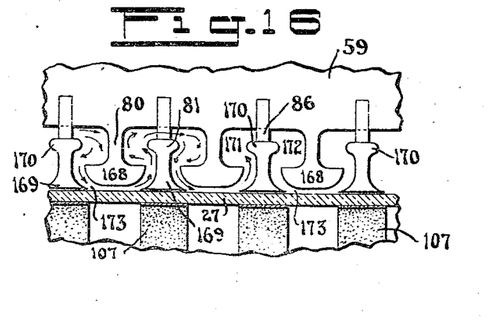
Figure 16 shows a modified form of treating chamber which may be used instead of that illustrated in connection with any of the machines herein described.

Figure 16 illustrates a fragment of a treating chamber having a construction similar to that shown in Figure 4a except that the treating baffles 80 are formed with enlarged inner edge portions 168 and the deflecting baffles 81 are formed with flared edge portions 169 and deflectors 170. With the treating and deflecting baffles thus formed, mixing chambers 171 and 172, removed from the action of the rays, are provided. While this feature is, by reason of the proportions of the parts, present in a measure in the chambers above described, it is there dependent upon the opacity of the substance being treated when the substance collects in layers of greater thickness than that through which the rays will pass. Accordingly, an advantage of providing treating and mixing chambers of the type illustrated in Figure 16 is that the substance being treated is subjected to a more accurate control as indicated by the arrows illustrating the character of the path traversed by the flowing substance through the chambers. It will be seen that the substance is adapted to shoot across the space 173 between the enlarged edge portions 168 and the tube 27 without being substantially mixed during the time required to traverse this passage. Moreover, as it emerges from the passage 173 it is directed upwardly by the edge 169 and impinges upon one of the deflectors 170 and because of the sudden change in its direction of flow becomes mixed before passing through the opening 86 on its way to the next passage 173 where it is subjected to a subsequent treatment in a moving stream substantially free from mixing. To further insure that substance, inadvertently passing between the edge 169 and the tube 27, shall not be treated, an opaque shield, or paint may be used to form opaque bands 174 on the inside of the tube 27. From the above it will be seen that means are provided in the treating chamber between the tube 27 and members 58—59 for forming a plurality of separate restricted paths 173 through which the substance is adapted to flow past and be exposed to active rays free from substantial mixing, and a plurality of separate mixing compartments 171—172, alternating with said paths for successively treating portions of a substance and mixing said treated portions with untreated portions.

Figure 17:
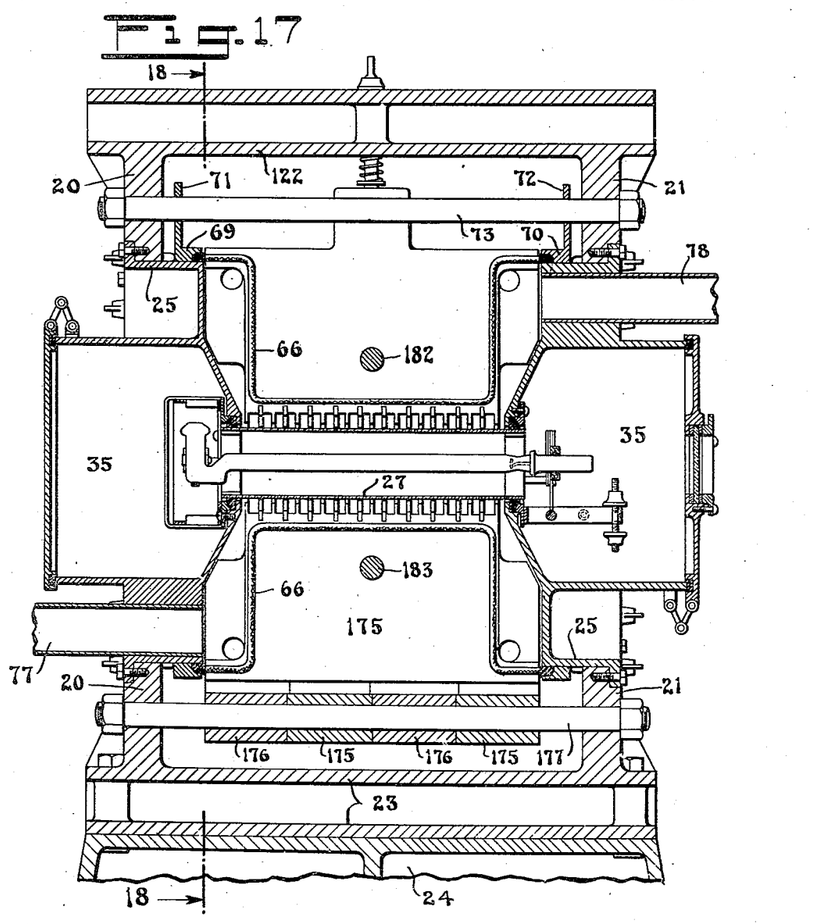
Figure 17 shows a sectional view of the device in which a split or sectional treating chamber may be opened by rotation about a hinge disposed in the base of the device.
Figure 18:
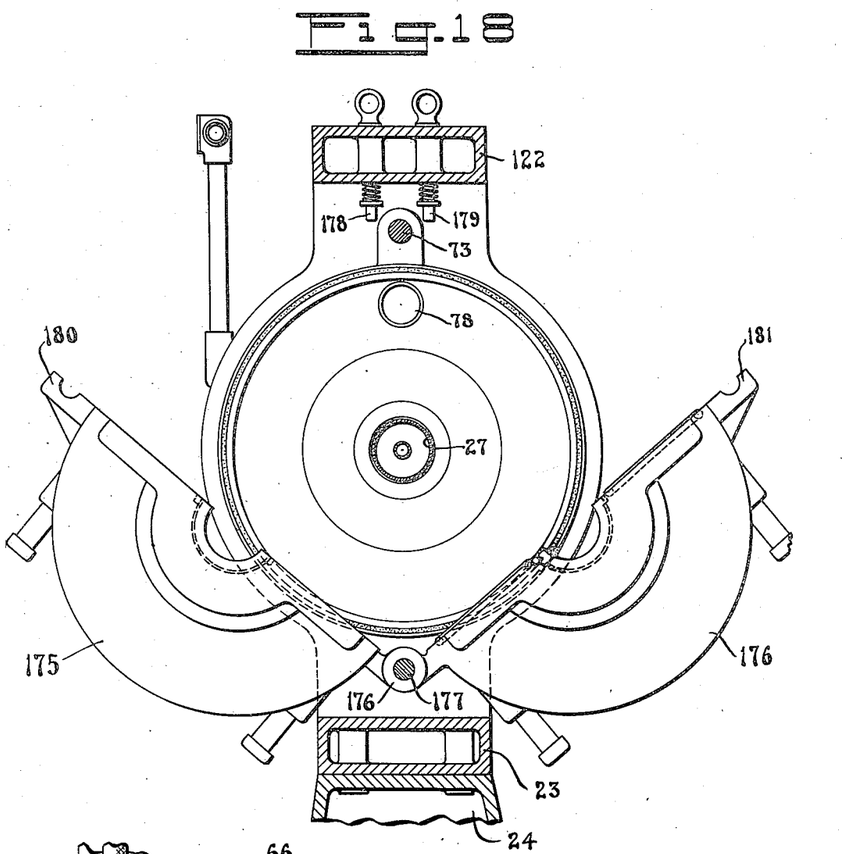
Figure 18 shows a view, partially in section, taken on line 18—18 of Figure 17 and looking in the direction of the arrows.

Figures 17 and 18 illustrate a further modification of our invention and particularly one in which the semi-circular members 175 and 176 are hinged to a rod 177 passing transversely of the machine and carried by the end supports 20 and 21 and are adapted to rotate about said hinge in coming together face to face and surround the tube. A machine of this type requires less floor space than that required when the transverse guide rods 42 and 43 above described are used. Snap latches 178 and 179 are mounted in the upper beam 22 to cooperate with lugs 180 and 181 formed on the upper portions of the members 175 and 176 respectively to hold the members in position against the locating rod 73 while they are being secured together by bolts 182 and 183 corresponding to bolts 67 and 68 above described. Inasmuch as the general structural features of the machine shown in Figures 17 and 18 are similar to those of the machines above described the corresponding parts of this machine are similarly numbered.

While we have described what seems now to be the preferred embodiments of our invention, it is conceivable that various modifications in the configuration, composition and disposition of the component elements going to make up our invention as a whole, as well as in the selective combination and application of the respective elements, may occur to those skilled in the art, and no limitation is intended by the phraseology of the foregoing description or illustrations in the accompanying drawings.

What is claimed is:

1. An irradiating device comprising, a source of ultra violet rays, an enclosure for said source transparent to said rays, mountings for said ray source and enclosure, and sectional means comprising cooperating sections forming with said enclosure an enclosed treating chamber in which substance disposed therein is adapted to flow in the form of a wholly confined layer and be exposed to rays emanating from said source, in combination with means mounting said sections for movement into and out of cooperating engagement, and means for securing said sections in fixed relationship to said enclosure.

2. An irradiating device comprising, a source of ultra violet rays, an enclosure for said source transparent to said rays, mountings for said ray source and enclosure, and sectional means comprising cooperating sections for forming with said enclosure a treating chamber in which substance disposed therein is adapted to flow in the form of a wholly confined layer and be exposed to rays emanating from said source, in combination with means mounting said sections for movement into and out of cooperating engagement, means for securing said sections in fixed relationship to said enclosure, and means for moving said sectional means as a unit with respect to said enclosure.

3. An irradiating device comprising, a source of ultra violet rays, an enclosure for said source transparent to said rays, mountings for said ray source and enclosure, and a pair of cooperating sectional members for forming with said enclosure a treating chamber in which substance disposed therein is adapted to flow in the form of a wholly confined layer and be exposed to rays emanating from said source, in combination with means mounting one of said sectional members at each side of said enclosure for movement toward and away from said enclosure, and means for locating said sectional members in fixed relationship to said enclosure.

4. An irradiating device comprising, a source of ultra violet rays, an enclosure for said source transparent to said rays, mountings for said ray source and enclosure, and a pair of cooperating sectional members for forming with said enclosure a treating chamber in which substance disposed therein is adapted to flow in the form of a wholly confined layer and be exposed to rays emanating from said source, in combination with means mounting one of said sectional members at each side of said enclosure for movement toward and away from said enclosures, means for locating said sectional members in fixed relationship to said enclosure, means for securing said members to said locating means, and means for adjusting said members as a unit with respect to said enclosure.

5. An irradiating device comprising, a source of ultra violet rays, an enclosure for said source transparent to said rays, mountings for said ray source and enclosure, and a pair of sectional members adapted, when brought together face to face, to form with said enclosure and between said mountings a treating chamber in which substance disposed therein is adapted to flow in the form of a wholly confined layer and be exposed to rays emanating from said source, in combination with means for sealing the members face to face, and means for sealing said members to said mountings.

6. An irradiating device comprising, a source of ultra violet rays, a cylindrical enclosure for said source transparent to said rays, mountings for said ray source and enclosure, and a pair of cooperating sectional members forming with said enclosure a treating chamber in which substance disposed therein is adapted to flow in the form of a wholly confined layer and be exposed to rays emanating from said source and forming inlet and outlet openings for said chamber, guiding and supporting means mounted in a plane normal to the axis of said enclosure upon which one of said sectional members is slidably mounted at each side of said enclosure in combination with means for securing said members together face to face about said enclosure, and means for sealing said members to the mounting means for said ray source and enclosure.

7. An irradiating device comprising, a source of ultra violet rays, a cylindrical enclosure for said source transparent to said rays, mountings for said ray source and enclosure, and a pair of cooperating sectional members forming with said enclosure a treating chamber in which substance disposed therein is adapted to flow in the form of a wholly confined layer and be exposed to rays emanating from said source and forming inlet and outlet openings for said chamber, guiding and supporting means mounted in a plane normal to the axis of said enclosure upon which one of said sectional members is slidably mounted at each side of said enclosure in combination with means for securing said members together face to face about said enclosure and to said guiding and supporting means, and means for moving said guiding and supporting means with reference to said enclosure.

8. An irradiating device comprising, a source of ultra violet rays, an enclosure for said source transparent to said rays, mountings for said ray source and enclosure, and sectional means comprising cooperating sections for forming with said enclosure a treating chamber in which substance disposed therein is adapted to flow in the form of a wholly confined layer and be exposed to rays emanating from said source, in combination with hingeable means supporting said sectional means for rotary movement into and out of cooperating engagement, and means for locating said sectional means in fixed relationship to said enclosure when said sections are in a position of cooperative engagement.

9. An irradiating device comprising a source of ultra violet rays, an enclosure transparent to said rays surrounding said source, and means forming a generally annular treating chamber surrounding said enclosure, and through which a substance to be treated is adapted to pass, in combination with a plurality of spaced baffle means substantially normal to the axis of said chamber for radially directing a substance traversing said chamber toward and away from said enclosure, said baffle means comprising a plurality of treating baffles each having an edge portion spaced from the surface of said enclosure, a deflecting baffle spaced from each treating baffle and having an edge portion proximate the surface of said enclosure, passages formed in said deflecting baffles at points remote from the edge portion thereof, and means to render the region of the enclosure under the edge portions of said deflecting baffles opaque to said rays.

10. An irradiating device comprising a source of ultra violet rays, an enclosure transparent to said rays surrounding said source, and a casing forming a generally annular treating chamber surrounding said enclosure, and through which a substance to be treated is adapted to pass, said enclosure having a plurality of spaced circumferential fins formed integral therewith and extending normally from the outside surface thereof to a point spaced from said casing, and means on the inside surface of said enclosure opposite each fin for rendering the enclosure opaque at the region of said fins, in combination with a plurality of spaced treating baffles extending normally from said casing to a point spaced from said enclosure and disposed, respectively, in the spaces between said fins, whereby said fins and treating baffles are adapted to radially direct a substance traversing said chamber toward and away from said enclosure.

11. An irradiating device comprising a chamber for a substance to be treated, a source of ultra violet rays, and means transparent to said rays disposed between said chamber and source and over which said substance is adapted to flow, in combination with means rendering portions of said transparent means opaque to said rays.

12. An article of manufacture made of material transparent to ultra violet rays and having a surface area adapted to be disposed between a substance and a source of ultra violet rays, in combination with a fin made of similar material formed integrally therewith and disposed substantially normal to said surface.

13. A cylinder of material transparent to ultra violet rays, comprising an integrally formed annular fin projection substantially normal to a surface of said cylinder and disposed intermediate the ends thereof.

14. A cylinder of material transparent to ultra violet rays, comprising an integrally formed annular fin projecting substantially normal to a surface of said cylinder and disposed intermediate the ends thereof, and means rendering that portion of the cylinder opposite said fin opaque to said rays.

15. A device for irradiating by means of ultra violet rays a partially opaque substance capable of having beneficial and detrimental effects imparted thereto, comprising an enclosure permeable to ultra violet rays, a source of ultra violet rays within said enclosure, in combination with annular fins integral with and disposed substantially normal to a surface of said enclosure.

16. An irradiating device comprising a source of ultra violet rays, in combination with an enclosed treating chamber in which substance disposed therein is adapted to flow in the form of a wholly confined layer and be exposed to rays emanating from said source, the confining walls of said treating chamber including an enclosure for said source transparent to said rays, and sectional means movable away from each other to open the enclosed treating chamber and expose all interior surfaces thereof which have been in contact with the substance being treated; mounting means for supporting said sectional means for opening and closing movement, and a second mounting means for supporting said enclosure.

17. An irradiating device comprising a source of ultra violet rays, in combination with an enclosure for said source transparent to said rays and forming a portion of the confining walls of an enclosed treating chamber in which substance disposed therein is adapted to flow in the form of a wholly confined layer and be exposed to rays emanating from said source, mountings for supporting said enclosure at the ends thereof, sectional means disposed intermediate the ends of said enclosure and forming about the same other wall portions of said treating chamber, aforesaid, mounting means for supporting said sectional means independently of the mountings for said enclosure.

18. An irradiating device comprising a source of ultra violet rays, an enclosure for said source transparent to said rays and forming a portion of the confining walls of an enclosed treating chamber in which substance disposed therein is adapted to flow in the form of a wholly confined layer and be exposed to rays emanating from said source, mountings for said enclosure, forming other wall portions of the treating chamber, sectional means forming about said enclosure the remaining wall portion of said treating chamber, mounting means for said sectional means supported independently of the moutings for said enclosure, in combination with means for locating said sectional means in fixed relationship to said mountings and enclosure.

19. In a device of the character described the combination of a cylinder of material transparent to ultra violet rays having an outside surface which forms a portion of the wall of a treating chamber, a source of ultra violet rays mounted within said cylinder, deflecting baffles terminating in close proximity to the outside surface of said cylinder and means rendering those portions of the inside surface of said cylinder opposite the ends of said deflecting baffles opaque to said rays.

20. An irradiating device comprising a source of ultra violet rays; in combination with an enclosed treating chamber in which a liquid substance therein is exposed to rays emanating from said source, the walls of said treating chamber including a tubular enclosure surrounding said ray source and transparent to said rays, and sectional means surrounding the circumference of said enclosure for any desired portion of the length thereof when said chamber is closed and movable away from each other and the tubular enclosure to open said treating chamber and expose the interior surfaces of the sectional means and the exterior surface of the tubular enclosure which have been in contact with the liquid substance being treated for direct cleaning of these surfaces; mounting means for supporting said sectional means in position surrounding the tubular enclosure; and a second mounting means supporting the tubular enclosure independently of the sectional means so that the latter may be moved away and leave exposed that portion of the exterior surface of the tubular enclosure which has been in contact with the liquid substance.

21. An irradiating device comprising a source of ultra violet rays; in combination with an enclosed treating chamber in which a liquid substance therein is exposed to rays emanating from said source, the walls of said treating chamber including an integral tubular enclosure surrounding said rays source and transparent to said rays, and sectional means surrounding the circumference of said enclosure for any desired portion of the length thereof when said chamber is closed and movable away from each other and the integral tubular enclosure to open said treating chamber and expose the interior surfaces of the sectional means and the exterior surface of the tubular enclosure which have been in contact with the liquid substance being treated for direct cleaning of these surfaces; mounting means for supporting said sectional means in position surrounding the tubular enclosure; and a second mounting means for supporting said enclosure.

22. A machine for treating liquid substances with active rays comprising a body portion, having mounted therein an elongated source of active rays, and a tube transparent to said rays surrounding said source, in combination with a closure member mounted on said body at each side thereof, each of said members having a face adapted to form with the tube a treating chamber surrounding said lamp adapted to direct the flow of the substance over the outside surface of said tube and between the opposed faces of said closure members, said body portion and closure members forming openings leading to and from said treating chamber.

EDWARD C. BERNDT.
HARRY M. CREIGHTON.